Patented June 20, 1939

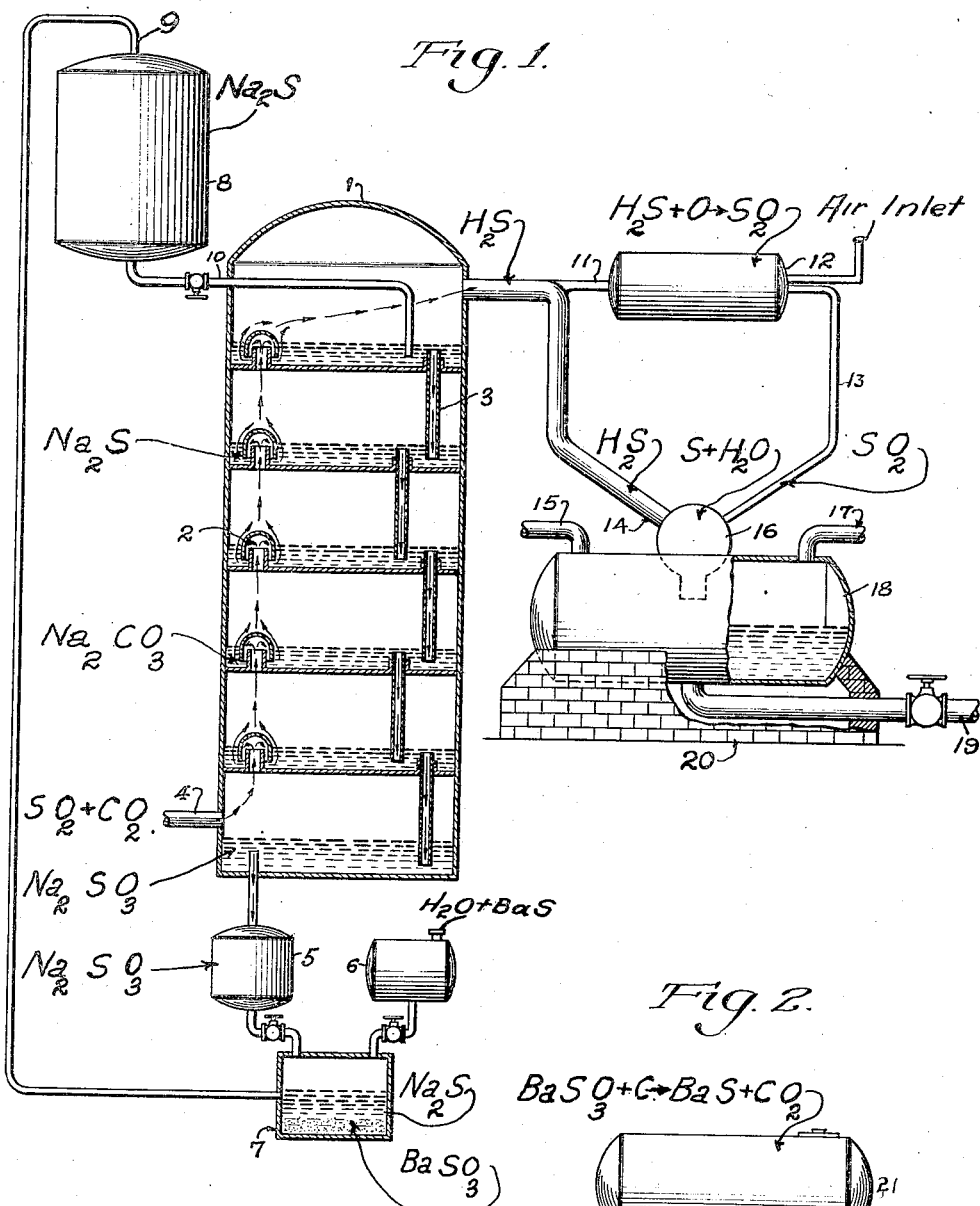

2,163,554

UNITED STATES PATENT OFFICE 2,163,554

PROCESS FOR MAKING ELEMENTAL SULPHUR FROM ORES AND GASES CONTAINING SULPHUR

Gant Gaither, Hopkinsville, Ky.

Application February 7, 1938, Serial No. 189,131

1 Claim. (Cl. 23—226)

This discovery relates to the production of elemental sulphur obtained from ores and gases containing sulphur in combination with other elements.

It is very desirable commercially to produce elemental sulphur from ores and gases containing sulphur, instead of having to convert these into sulphuric acid as now practised. This is particularly true of smelters and smelter gas from copper, zinc, iron and lead ores. These smelters are usually located far from the site of chemical industries where sulphuric acid is in demand. When these smelters make sulphuric acid from gases and ores it has to be shipped in tank cars at high rates of freight. It therefore becomes distinctly important to produce the elemental sulphur from these ores and gases with much lower freight rates, rather than make sulphuric acid. At present there are several patents in foreign countries relating to this same problem, but as far as the inventor knows, they in no wise disclose the same process.

In general terms my discovery consists of burning sulphur ores to sulphur dioxide or taking the smelter gases directly from the regular smelter and conducting this impure sulphur dioxide gas consisting of sulphur dioxide, carbon dioxide, chlorine, fluorine, small amounts of arsenic and other minute contaminations, through usual dust catchers to remove the floating particles. The gases are then led into a solution of alkali carbonate, usually sodium carbonate. In this chamber the sulphur dioxide becomes fixed as a sulphite, i. e., sodium sulphite, with carbon dioxide liberated from the carbonate, (Reaction #1), and is added to the carbon dioxide contaminating original smelter gas. This carbon dioxide gas is led from the sulphiting chamber under pump or vacuum pressure into a solution of alkali sulphide, usually sodium sulphide, thereby producing alkali carbonate, i. e., sodium carbonate with evolution of hydrogen sulphide gas, (Reaction #2), which gas is led to a special burner. At this point the hydrogen sulphide gas may be handled in one of three ways:

(a) One-third may be burned to pure sulphur dioxide, (Reaction #3), which is led into a chamber where it mixes with the other two-thirds of the hydrogen sulphide, (Reaction #4). In this chamber sulphur is precipitated and water formed by the combination of the two gases.

(b) The hydrogen sulphide may be burned with a reduced amount of the oxygen supplied, in which event sulphur is largely precipitated and a very small amount of sulphur dioxide is formed also, (Reaction #5). This small amount of sulphur dioxide is admixed with twice its volume of hydrogen sulphide so that sulphur and water are formed, making the complete conversion to sulphur and water all of the hydrogen sulphide gas.

(c) One-third of the smelter gas as sulphur dioxide may be retained and not put through the above process and hydrogen sulphide resulting from putting the other two-thirds of the smelter gas through the process, may be admixed as in (a) and (b).

This process is made cyclic by the use of barium sulphide, as follows: alkali sulphite solution above formed in strong $SO_2$ solution is completely neutralized with sodium carbonate and then is treated with barium sulphide precipitating barium sulphite leaving in solution alkali sulphide, i. e., sodium sulphide, (Reaction #6), to be used in the above described steps where carbon dioxide is led into alkali sulphide to evolve hydrogen sulphide gas. The barium sulphite is placed in the reduction furnace and roasted with carbon, being reduced thereby to barium sulphide ready to re-use in the alkali sulphite, (Reaction #7). Roasting barium sulphite with carbon to produce barium sulphide is accomplished practically without cost in places where the heat of burning sulphide ores may be made use of. Also the heat of burning hydrogen sulphide in (a) and (b) may be made use of for the same or other purposes of plant operation.

Thus by simple chemistry with reasonable cost of operating the reduction furnace and the plant cost of handling the ores and gases elemental sulphur can be economically produced from these ores and gases containing sulphur in combination with other elements.

In the manufacture of elemental sulphur by this new and useful process the following chemical reactions are made use of:

*Chemical reactions*

(1) $SO_2 + Na_2CO_3 \rightarrow Na_2SO_3 + CO_2$
(2) $CO_2 + Na_2S + H_2O \rightarrow Na_2CO_3 + H_2S$
(3) $H_2S + 3O \rightarrow H_2O + SO_2$
(4) $SO_2 + 2H_2S \rightarrow 2H_2O + 2S$
(5) $H_2S + O \rightarrow H_2O + S$
(6) $Na_2SO_3 + BaS \rightarrow BaSO + Na_2S$
(7) $2BaSO_3 + 3C \rightarrow 2BaS + 3CO_2$ The attached flow sheet Figures 1 and 2 show schematically the entire courses and cycle of the production. The following is the explanation:

Figure No. 4 is the entrance pipe of the sulphur dioxide gases admixed with a slight $CO_2$ contamination into a bubble tower, which gases pass through a bell trap to bubble through sodium carbonate solution. The $SO_2$ gas at once is fixed as sodium sulphite which descends by gravity from this chamber to the bottom of the tower. The $CO_2$ liberated in the same reaction, passes up through a bell trap into other gas chambers where the $CO_2$ admixed with a small amount of $SO_2$ (which probably is not captured in the first bubble compartment), goes through the second level of sodium carbonate so that the circulating gas is cleared of all sulphur dioxide which is fixed as sodium sulphite. The $CO_2$ gas then ascends through the next bell cap No. 2 where it bubbles through sodium sulphide solution, making a new supply of sodium carbonate for the chamber below and liberating hydrogen sulphide gas. This mixed gas passes into a bubble chamber carrying small vestiges of $CO_2$ to be fixed as sodium carbonate, leaving the gas pure hydrogen sulphide for its final scrubbing in the top chambers where it finds its outlet as hydrogen sulphide, leaving sodium carbonate to descend. At this outlet hydrogen sulphide gas is divided—one-third being carried by an inlet No. 11 into a burning compartment provided with an air inlet where it is converted into $SO_2$ and carried out through pipe No. 12 down to compartment No. 16 where it meets the other two-thirds of hydrogen sulphide going down through pipe No. 14. It is admixed in the reaction chamber No. 18 forming sulphur and steam, the steam being released through pipes Nos. 15 and 17 and sulphur drawn off through pipe No. 19. In the bubble tower, the solution starts in tank No. 8 as sodium sulphide and descends through various chambers by means of overflow pipes as No. 3 becoming sodium carbonate and in the bottom chamber sodium sulphite. This sulphite then goes into tank No. 5 preparatory to meeting in tank No. 7 with hot barium sulphide solution from tank No. 6, water being added at this point to make barium sulphide solution. This reaction takes place in tank No. 7, sodium sulphide solution being formed which is carried back through pipe No. 19 through pump mechanism to tank No. 8 as sodium sulphide to start the process over. From tank No. 7 barium sulphite is taken out and put into the roasting furnace, (which might be in the ore roaster), in Figure 2 and is converted back in this furnace to barium sulphide to go again to tank No. 6.

What I claim is:

The cyclic process of preparing sulphur from sulphur dioxide which comprises, absorbing sulphur dioxide in a solution of alkali carbonate, whereby carbon dioxide and sodium sulphite solution are produced, reacting said sodium sulphite solution with hot barium sulphide solution, whereby barium sulphite is precipitated and sodium sulphide solution is produced, reducing said barium sulphite with carbon, whereby barium sulphide is produced, recycling said barium sulphide, absorbing said carbon dioxide in said sodium sulphide solution, whereby sodium carbonate solution and hydrogen sulphide are produced, recycling said sodium carbonate solution, with sulphur dioxide just entering the process, and finally oxidizing said hydrogen sulphide to elemental sulphur.

GANT GAITHER.